United States Patent
Duttweiler

(10) Patent No.: US 6,604,119 B1
(45) Date of Patent: Aug. 5, 2003

(54) HIGH ORDER SINC FILTER

(75) Inventor: Donald Duttweiler, Rumson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/452,487

(22) Filed: Dec. 1, 1999

(51) Int. Cl.$^7$ ............................................. G06F 17/17
(52) U.S. Cl. ........................................................ 708/313
(58) Field of Search ................. 708/313, 319, 708/300, 320

(56) References Cited

U.S. PATENT DOCUMENTS

| | | | | |
|---|---|---|---|---|
| 5,130,942 A | * | 7/1992 | Enari ........................... | 708/319 |
| 5,214,676 A | * | 5/1993 | Wilkinson ................... | 708/313 |
| 5,583,887 A | * | 12/1996 | Murata et al. .............. | 708/313 |
| 5,732,002 A | * | 3/1998 | Lee et al. .................... | 708/313 |
| 5,831,879 A | * | 11/1998 | Yom et al. ................... | 708/319 |
| 6,052,701 A | * | 4/2000 | Koslov et al. .............. | 708/313 |

* cited by examiner

Primary Examiner—Tan V. Mai

(57) ABSTRACT

A high order SINC interpolator and as a high order SINC decimator. The high order SINC interpolator includes an interpolator input and a plurality of cascades of integrators. The inputs of each of the cascades are coupled to the interpolator input through a low frequency delay circuit. The outputs of each of the cascades of integrators are coupled through a plurality of adders to generate a single interpolator output. The high order SINC decimator includes a decimator input and a plurality of cascades of integrators. The decimator input is coupled to the input of each of the cascades of the integrators. At least one low frequency delay circuit is coupled to an output of the cascades of the integrators and the output of each low frequency delay circuit is coupled to the decimator output through an adder.

10 Claims, 4 Drawing Sheets

HIGH ORDER SINC FILTER

FIELD OF THE INVENTION

The present invention relates to the field of electronic filters, and more particularly to high order SINC filters that shape signals to follow the trigonometric function SINC defined as SINC(f)=sin(f)/f, where f is the frequency of the input signal.

BACKGROUND OF THE INVENTION

Electronic filters are widely used today in communications systems. For example, circuits that perform interpolation and decimation functions use filters that spectrally shape a signal in such a way that the filter's output is a function of some desired mathematical function. Certain interpolator and decimator circuits use SINC filters that shape signals to follow the trigonometric function SINC. Such filters can be implemented as first, second, third or higher order filters depending on the requirements of system in which they are used.

Low order SINC filters, such as first and second order filters, which can be implemented using relatively simple circuits, have poor attenuation at high frequencies compared to high order SINC filters, such as third and higher order filters. The impulse response of an $M^{th}$ order filter is the impulse response of a first order SINC filter convolved with itself M times. An $M^{th}$ order filter is realized by cascading M first-order filters together.

High order SINC filters suffer from a significant drawback. Specifically, they require additional circuitry, such as multipliers, adders and memory because their impulse responses are spread over three or more periods of a sub-sampled clock, rather than just one or two periods as in lower order SINC filters. For example, the memory requirements of such filters increase proportionately with N, the ratio of the sub-sampling frequency to the main clock frequency. Adding additional circuitry adds to the complexity, cost and power consumption of the circuit.

SUMMARY OF THE INVENTION

We have developed in accordance with the principles of the invention an interpolator circuit and a decimator circuit which are each fabricated using high order SINC filters. The interpolator circuit includes a plurality of cascades of three integrators, wherein the output of each of the cascades of integrators is coupled to a plurality of adders to generate a single integrator output. The decimator circuit includes a plurality of cascades of three integrators and an output, wherein one or more of the integrators in each cascade are coupled to an output of the cascades of three integrators and the output of each integrator in a cascade is coupled to the decimator output through an adder circuit. Advantageously, unlike conventional high order SINC filters, increasing the sub-sampling ratio of either the high order SINC interpolator or decimator fabricated according to the present invention does not result in a corresponding increase in circuit complexity.

DETAILED DESCRIPTION OF THE DRAWINGS

Figure 1:
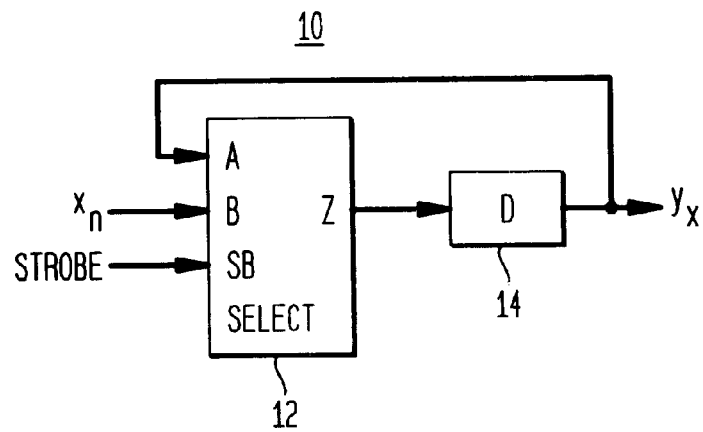
FIG. 1 is a block diagram of a prior art first order SINC interpolator circuit.

FIG. 1 shows a block diagram of a prior art first order SINC filter 10 which is a conventional sample and hold circuit that operates as an interpolator when the input is a signal that is non-zero only every $N^{th}$ sample. Since the present invention incorporates filter 10, a review of its operation will aid in understanding the operation of the present invention. Filter 10 has input and output signals $x_n$ and $y_n$, respectively, wherein n represents the number of clock periods.

When a first-order SINC filter, such as filter 10, is used as an interpolator, its input is nonzero only every $N^{th}$ sample. This absence of an input signal can be used to implement an efficient first-order SINC interpolator. Filter 10 includes a selector block 12, and a delay element 14 implemented using a D flip-flop. Selector block 12 generates an output Z selected from one of two inputs, i.e., A or B, based on the state of a binary signal at third input SB. When the strobe signal at input SB is high, output Z equals signal $x_n$, i.e., input B, and when the strobe signal at input SB is low, output Z equals signal $y_n$, i.e., input A. The strobe signal is a pulse signal having pulses that occur at the subsampling rate. By contrast, in a decimator, the input varies at a high clock rate, but is only used at the subsampled clock rate.

Figure 2:
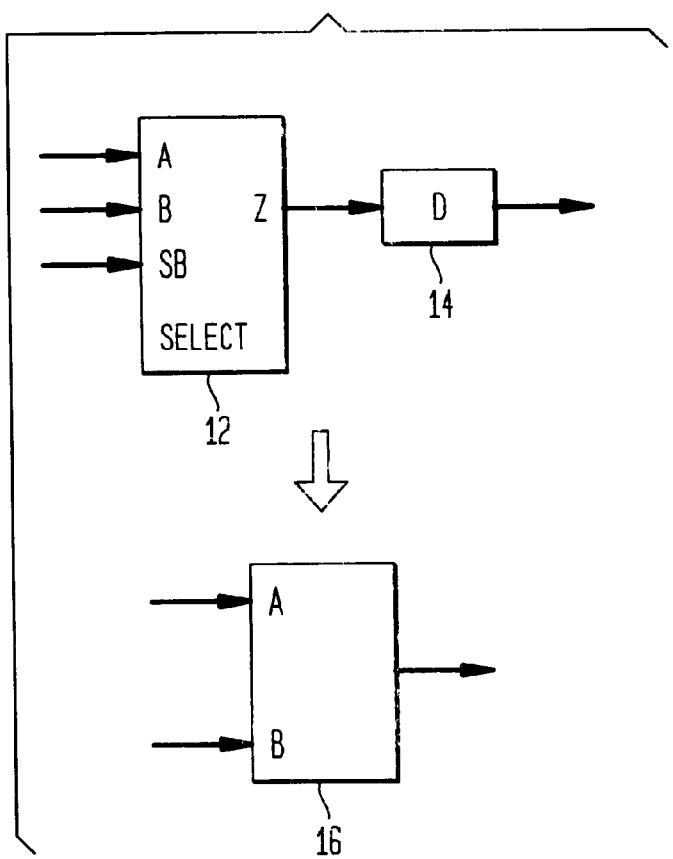
FIG. 2 is a diagram of a shorthand representation of a SELECT block and a D flip-flop.

Since the combination of Selector block 12 and D flip-flop 14 is repeatedly used herein, for purposes of convenience the combination will hereinafter be represented by a block 16 shown in FIG. 2.

Efficient third-order SINC interpolators can be implemented by combining three parallel cascades of two integrators together with additional circuitry for handling initialization functions. For interpolator circuits, the first of the three filters employed in such a cascade can use the fact that the input is nonzero only every $N^{th}$ sample to be implemented using interpolator circuit 22.

Figure 3:
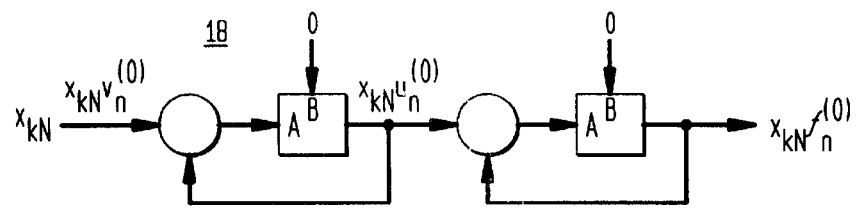
FIG. 3 is a block diagram of a first component of an exemplary embodiment of a third-order SINC interpolator fabricated according to the present invention.
Figure 4:
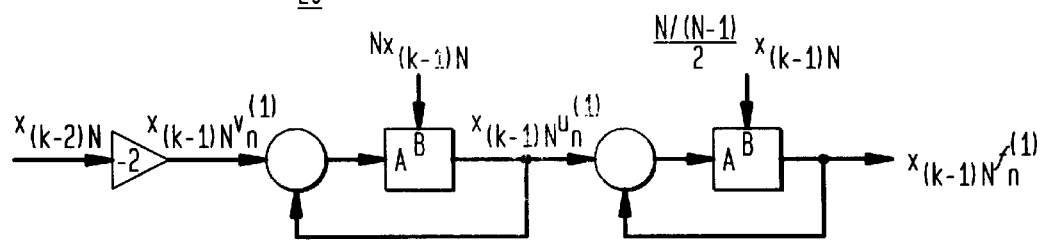
FIG. 4 is a block diagram of a second component of an exemplary embodiment of a third-order SINC interpolator fabricated according to the present invention.
Figure 5:
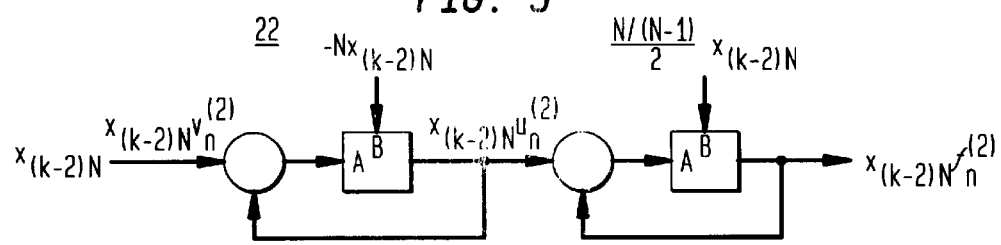
FIG. 5 is a block diagram of a third component of an exemplary embodiment of a third-order SINC interpolator fabricated according to the present invention.
Figure 6:
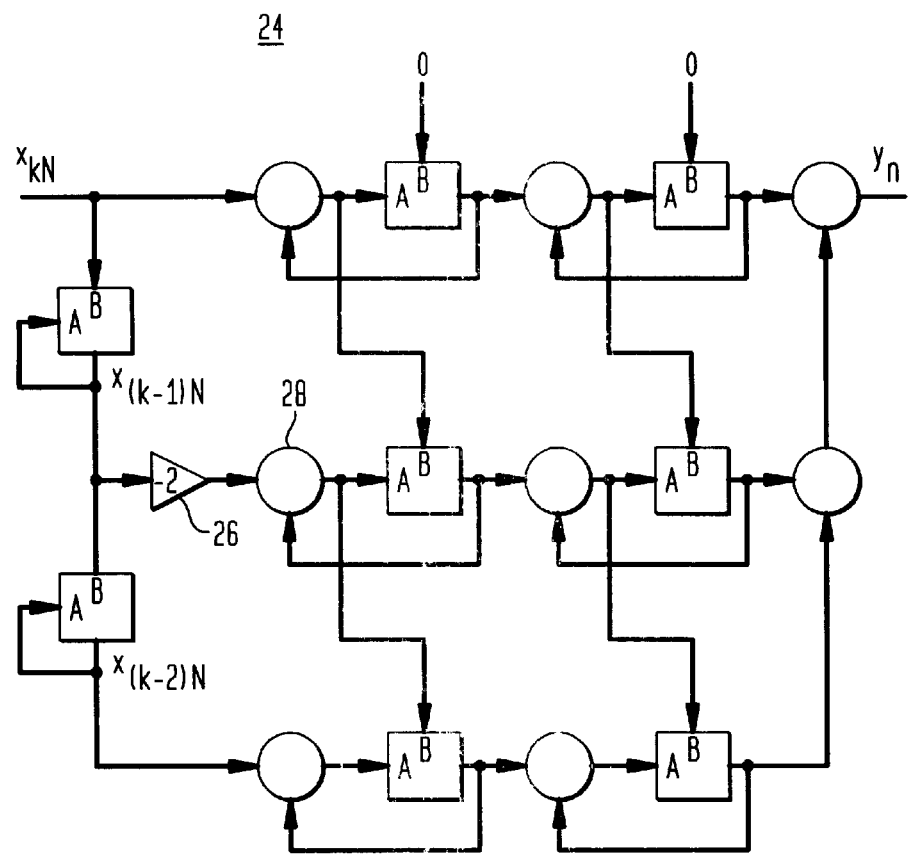
FIG. 6 is a block diagram of an exemplary embodiment of a third-order SINC interpolator fabricated according to the present invention using the first, second and third components shown in FIGS. 3–5.

In accordance with a first embodiment of the present invention, an efficient third-order interpolator is achieved by introducing a latency of two clock periods into the interpolator. The operation of such a third-order SINC interpolator is described by the following equation:

$$y_{kN+n} = x_{kN} f_n^{(0)} + x_{(k-1)N} f_n^{(1)} + x_{(k-2)N} f_n^{(2)} \qquad (1)$$

where $$f_n^{(0)} = f_n \qquad (2)$$

$$f_n^{(1)} = f_{N+n} \qquad (3)$$

$$f_n^{(2)} = f_{2N+n} \tag{4}$$

$$f_n = f_{n-2} = g_n - 3g_{n-N} + 3g_{n-2N} - g_{n-3N} \tag{5}$$

and $$g_n = g_{n-2} = \begin{cases} 0, & n \in (-\infty, 0) \\ n(n-1)/2, & n \in (0, \infty) \end{cases} \tag{6}$$

and where $y_{kN+n}$ is the output signal of the interpolator at time kN+n, k being an index number used to count samples, $x_{kn}$ is the input signal and $f_n$ is the time response of the three different parallel paths of the interpolator. The term $x_{kN} f_n^{(0)}$ is generated by a cascade of two integrator circuits shown in block diagram form in FIG. 3 that comprises a first component 18 of an exemplary embodiment of a third-order interpolator fabricated according to the present invention. The term $x_{(k-1)N} f_n^{(1)}$ is generated by the circuit shown in block diagram form in FIG. 4 that comprises a second component 20 of an exemplary embodiment of a third-order interpolator fabricated according to the present invention. The term $x_{(k-2)N} f_n^{(2)}$ is generated by the circuit shown in block diagram form in FIG. 5 that comprises a third component 22 of an exemplary embodiment of a third-order interpolator fabricated according to the present invention. FIG. 6 is a block diagram of an exemplary embodiment of a third-order interpolator circuit 24 fabricated according to the present invention using the components shown in FIGS. 3–5. The output of interpolator 24 is $y_{kN+n}$.

A −2× multiplier 26 in FIG. 6 is implemented by subtracting the signal instead of adding the signal following adder 28, and a 2× multiplier is implemented using a shift register. Third-order interpolator 24 uses 8 bytes of memory and 8 adders. The number of circuit elements required to implement interpolator 24 is independent of and does not increase with an increase in N.

The present invention can be used to fabricate interpolators of any desired order. An Mth-order interpolator will have M rows of (M−1)-order cascades of accumulators. The integrators in the first row are periodically initialized to zero, while the integrators in all other rows are periodically initialized to values taken from the other rows. The inputs to the rows are low frequency input signals at various delays, and the high frequency output is obtained by summing the outputs from the rows.

Figure 7:
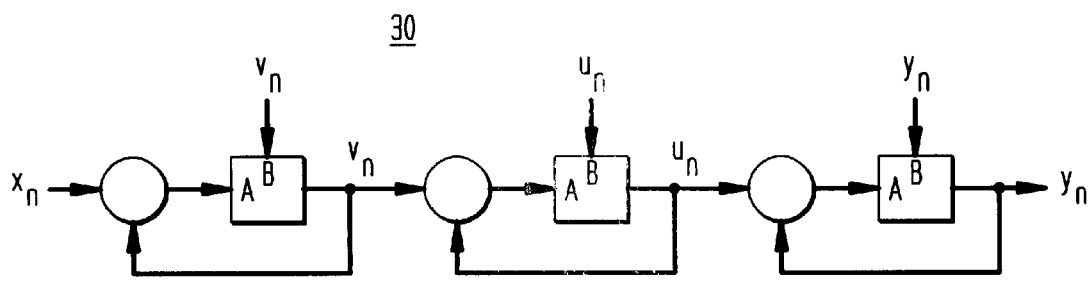
FIG. 7 is a block diagram of a component of an exemplary embodiment of a third-order SINC decimator fabricated according to the present invention.
Figure 8:
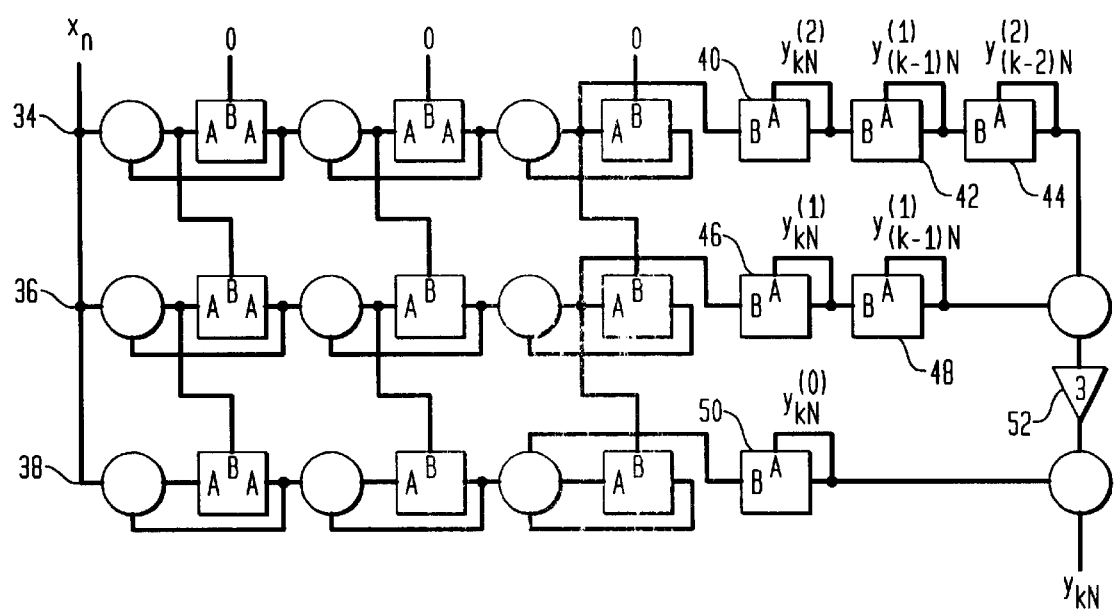
FIG. 8 is a block diagram of an exemplary embodiment of a third-order SINC decimator fabricated according to the present invention using three of the components shown in FIG. 7.

FIG. 7 is a block diagram of a circuit 30 that is the integral component of an exemplary embodiment of an efficient third-order decimator fabricated according to the present invention. FIG. 8 block diagram comprises a cascade of three of the integrator circuits 30 shown in FIG. 7 to generate three outputs combined together with additional circuitry to produce an exemplary embodiment of a third order decimator circuit 32 according to the present invention.

The cascade of three integrators in decimator circuit 32 comprises three rows 34, 36 and 38 of integrator circuits. In first row 34, the accumulator initialization is zero; in second row 36, the initialization is performed by signals from first row 34; and in third row 38, the initialization is performed by signals from second row 36. Decimator circuit 32 also includes additional circuitry comprised of interpolator components 40, 42, 44, 46, 48, 50 and 52 which serves three functions. Specifically, this additional circuitry adds delays at the lower frequency sampling clock rate, scales the outputs of the rows 34–38, and adds such outputs together to generate a final output. The operation of efficient third-order SINC decimator circuit 32 is described by the following equation:

$$y_{kN} = y_{kN}^{(0)} - 3y_{(k-1)N}^{(1)} + 3y_{(k-2)N}^{(2)} \tag{7}$$

wherein $y_{kN}$ is the output of decimator circuit 32.

In decimator circuit 32, the multiplication by 3 performed by multiplier 52 can be realized by a shift and add. Decimator circuit 32 uses 15 words of memory, 12 accumulators, and no multipliers. As with interpolator circuit 24, the number of circuit elements in decimator circuit 32 does not depend on the sub-sampling ratio N.

The present invention can be used to fabricate decimators of any desired order. An $M^{th}$-order decimator will have M rows of (M−1)-order cascades of accumulators. The integrators in the first row are periodically initialized to zero. The integrators in all other rows are periodically initialized to values taken from the other rows. All rows are driven by the high-frequency signal. The final low-frequency output is obtained by sampling the row outputs at the low-frequency, delaying these sampled outputs by increasing numbers of low frequency periods, and then summing scaled versions of these delayed signals.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure and method may be varied substantially without departing from the spirit of the invention and the exclusive use of all the modifications which come within the scope of the appended claims is reserved.

What is claimed is:

1. An $M^{th}$-order SINC interpolator comprising:
    M rows of (M−1)-order cascades of integrators which are coupled together, wherein each one of the cascades of integrators has an input and an output, and wherein the inputs of the cascades of integrators in one row are periodically initialized to zero, and the inputs of the cascades of integrators in the other rows are periodically initialized to values taken from the other rows.

2. The $M^{th}$-order SINC interpolator according to claim 1, wherein the inputs of each one of the cascades of integrators are coupled to an interpolator input which receives low frequency signals of varying delays.

3. The $M^{th}$-order SINC interpolator according to claim 2, wherein the output of each one of the cascades of integrators is coupled through a plurality of adders to generate a single integrator output.

4. The $M^{th}$-order SINC interpolator according to claim 1, wherein each one of the integrators comprises an adder, a select block and a D flip-flop.

5. The $M^{th}$-order SINC interpolator according to claim 4, wherein each select block comprises a strobe input and two additional inputs, and an output, one of the additional inputs being coupled to the D flip-flop output.

6. The $M^{th}$-order SINC interpolator according to claim 5, wherein the output is coupled to the D flip-flop input and wherein the output is determined by the state of the strobe input.

7. The $M^{th}$-order SINC interpolator according to claim 1, wherein each cascade of integrators comprises a pair of integrators.

8. The $M^{th}$-order SINC interpolator according to claim 1, wherein the SINC interpolator is a third-order interpolator comprised of three cascades of integrators.

9. The $M^{th}$-order SINC interpolator according to claim 1, wherein the output of the interpolator is comprised of the three components $x_{kN} f_n^{(0)}$, $x_{(k-1)N} f_n^{(1)}$ and $x_{(k-2)N} f_n^{(2)}$ from the equation $y_{kN+n} = x_{kN} f_n^{(0)} + x_{(k-1)N} f_n^{(1)} + x_{(k-2)N} f_n^{(2)}$, wherein $y_{kN+n}$ is the output signal of the interpolator at time kN+n, k being an index for counting samples N and n being an index for counting clock periods, and $x_{kn}$ is the input signal and $f_n$ is the time response of three different parallel paths of the interpolator.

10. A third-order SINC interpolator comprising:

first, second and third cascades of integrators, wherein each cascade of integrators has an input and an output, the inputs of each of the cascades being coupled to an interpolator input which receives low frequency signals of varying delays and the inputs of the cascades of integrators in one row are periodically initialized to zero, and the inputs of the cascades of integrators in the other rows are periodically initialized to values taken from the other rows; and the outputs of each of the cascades of integrators being coupled through a plurality of adders to generate a single integrator output.

* * * * *